(12) United States Patent
Overcash

(10) Patent No.: US 7,118,163 B1
(45) Date of Patent: Oct. 10, 2006

(54) CANTILEVERED HATCH BACK CONSTRUCTION

(76) Inventor: Duane K. Overcash, 3271 SE. 23rd St., Gresham, OR (US) 97080

(*) Notice: Subject to any disclaimer, the term of this patent is extended or adjusted under 35 U.S.C. 154(b) by 85 days.

(21) Appl. No.: 11/056,742

(22) Filed: Feb. 11, 2005

(51) Int. Cl.
*B60J 5/02* (2006.01)

(52) U.S. Cl. .................... 296/146.8; 296/164

(58) Field of Classification Search ........... 296/146.8, 296/106, 156, 164, 146.9, 56, 100.03, 100.06, 296/100.07; 49/340, 141
See application file for complete search history.

(56) References Cited

U.S. PATENT DOCUMENTS

| | | | | |
|---|---|---|---|---|
| 3,411,819 A | * | 11/1968 | Tyree et al. | 296/164 |
| 3,635,515 A | * | 1/1972 | White et al. | 296/164 |
| 4,247,145 A | * | 1/1981 | Groene | 296/164 |
| D299,817 S | * | 2/1989 | Wolcott et al. | D12/403 |
| 4,807,924 A | * | 2/1989 | Kottke | 296/164 |
| 5,035,449 A | * | 7/1991 | Shiratori et al. | 296/106 |
| D330,183 S | * | 10/1992 | Zoromski | D12/405 |
| 5,213,390 A | * | 5/1993 | Borchers | 296/165 |
| D367,463 S | * | 2/1996 | Reiland | D12/404 |
| 5,667,268 A | * | 9/1997 | Bump | 296/37.6 |
| 5,735,565 A | | 4/1998 | Papai et al. | 296/39.2 |
| 5,820,189 A | * | 10/1998 | Tew | 296/164 |
| 6,019,410 A | | 2/2000 | Trostle et al. | 296/26.11 |
| 6,554,340 B1 | | 4/2003 | Stevenson | 296/26.11 |

OTHER PUBLICATIONS

MX Series advertisement.

* cited by examiner

*Primary Examiner*—Kiran B. Patel
(74) *Attorney, Agent, or Firm*—Sturm & Fix LLP

(57) ABSTRACT

A hatch back construction (10) for the bed (101) of a pick-up truck (100) equipped with a camper shell (200) wherein, the construction (10) includes a hatch back member (20) provided with a step shouldered continuous peripheral skirt (21) having an outer portion (21') with a minimum width of 3" and further having an outwardly extending portal sleeve (22) equipped with a door element (30) wherein, the hatch back construction (10) expands the effective length of the bed (101) of the pick-up truck (100) by a minimum of 5".

9 Claims, 3 Drawing Sheets

CANTILEVERED HATCH BACK CONSTRUCTION

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of vehicle end gate constructions in general and in particular to a cantilevered center door hatch back construction that is specifically designed to increase the useful space in the rear cargo area of the vehicle.

2. Description of Related Art

As can be seen by reference to the following U.S. Pat. Nos. 5,735,565; 6,554,340; 6,019,410; and, Des. 367,463, the prior art is replete with myriad and diverse truck bed extender arrangements to increase the usable space in the rear cargo area of a vehicles.

While all of the aforementioned prior art constructions are more than adequate for the basic purpose and function for which they have been specifically designed, they are uniformly deficient with respect to their failure to provide a simple, efficient, and practical arrangement for extending the rear cargo area of a vehicle.

As most tall SUV owners, and particularly those between 6' and 6' 5", are all too well aware, the majority of SUVs have a standard length cargo bed that is exactly 6' long, which makes it very uncomfortable for someone having a height in excess of 6' to sleep in the cargo area of their vehicle particularly if that individual is accustomed to sleeping on their back with their legs stretched out in font of them.

Given the fact that the average height of an American male is in excess of 5' 10", there is a large segment of the male population of this country whose height falls in the targeted range of this invention (e.g., 6' to 6'5").

Furthermore, within that segment there is an equally large percentage of individuals whose outdoor activities such as hunting, fishing, camping, seasonal firefighting, etc., lend themselves to occasionally utilizing the cargo area of their SUVs for the purpose of sleeping in a dry environment out of the wind and elements.

As a consequence of the foregoing situation, there has existed a longstanding need among the aforementioned segment of the population for a new and improved cantilevered hatch back construction that will extend the useful length of the rear cargo area of an SUV by a minimum of 5", and the provision of such a construction is a stated objective of the present invention.

BRIEF SUMMARY OF THE INVENTION

Briefly stated, the cantilevered hatch back construction that forms the basis of the present invention comprises in general a hatch back member provided with a continuous step shouldered peripheral skirt that extends forwardly a minimum of 5" and is further provided with an outwardly extending portal sleeve that is centrally disposed on the hatch back member and adapted to receive and support a hinged door panel.

As will be explained in greater detail further on in the specification, the outer portions of the step shouldered peripheral skirt displaces the portal surround portion of the hatch back member a minimum distance of 3" from the standard rearward displacement of conventional center door equipped hatch back constructions, an example of which can be seen in the MX series of camper shell door arrangements produced by ARE.

In addition, the peripheral skirt of this invention further provides: a mounting surface for a hinged connection between the upper edge of the hatch back member and the roof of an SUV; a bearing and connecting surface for a pair of pivoted spring biased braces that will maintain the hatch back member in a raised position when required; and, mounting surfaces for a pair of lockable side latches that will maintain the hatch back member per se in a closed and locked position relative to the rear cargo area of an SUV.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
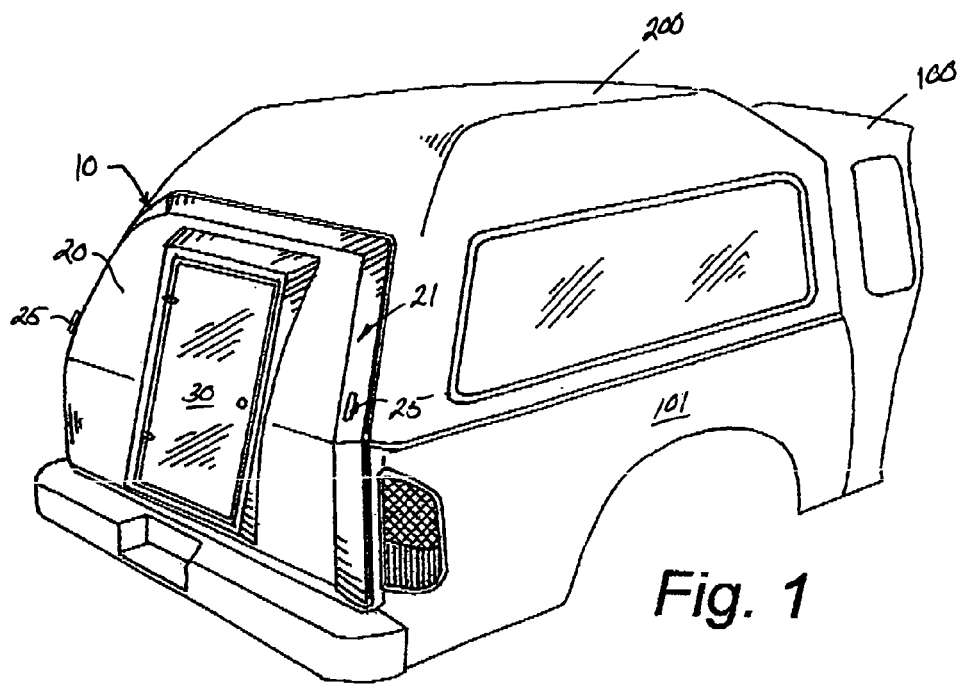
FIG. 1 is a perspective view of an SUV equipped with the cantilevered hatch back construction of this invention.

As can be seen by reference to the drawings, and in particularly to FIG. 1, the cantilevered hatch back construction that forms the basis of the present invention is designated generally by the reference number 10 and is specifically designed to be employed in conjunction with the bed 101 of a pick-up truck 100 equipped with a camper shell 200.

Figure 2:
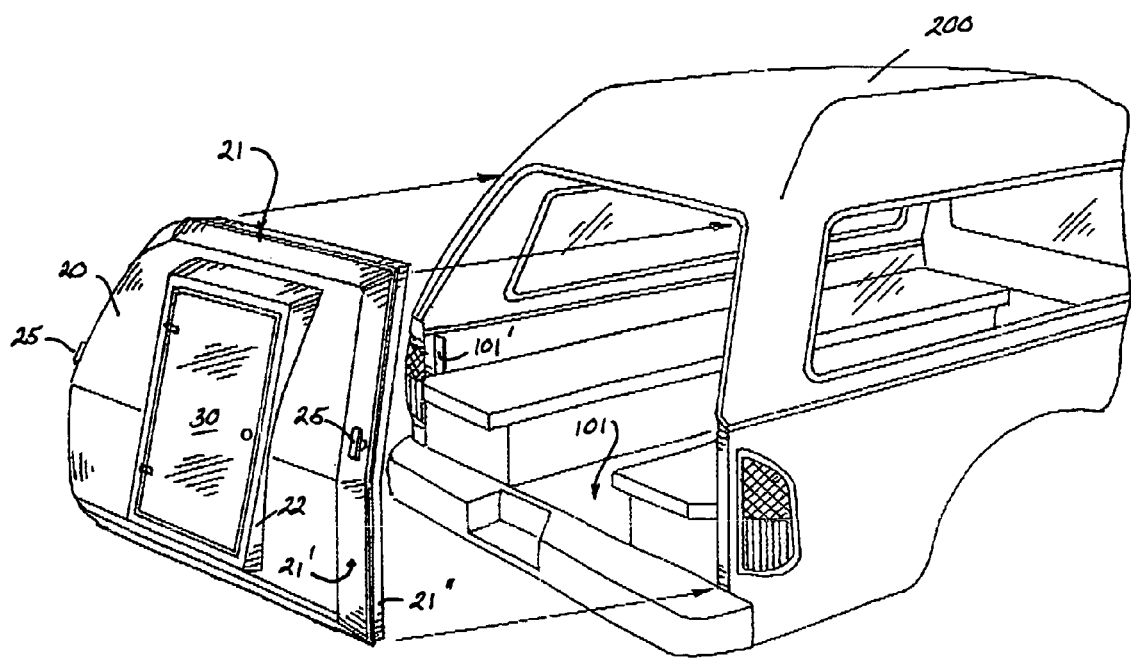
FIG. 2 is an exploded perspective view of the hatch back construction and the SUV.
Figure 3:
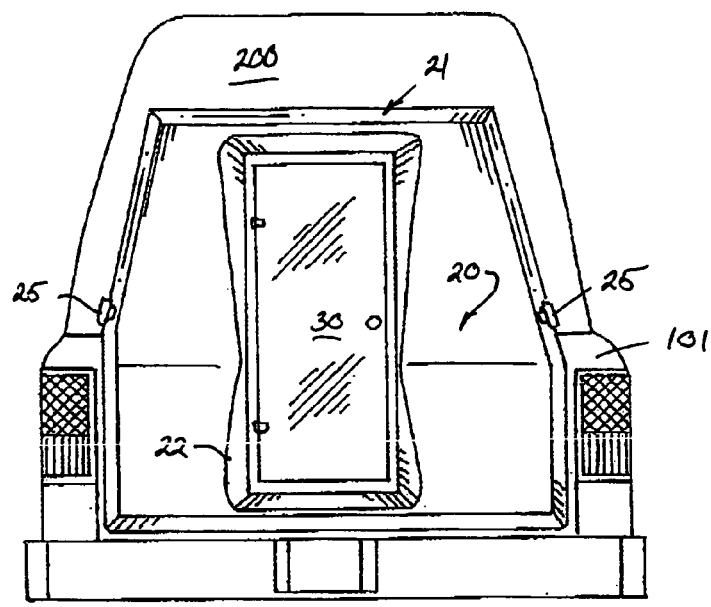
FIG. 3 is a rear plan view of the arrangement depicted in FIG. 1.
Figures 4, 5:
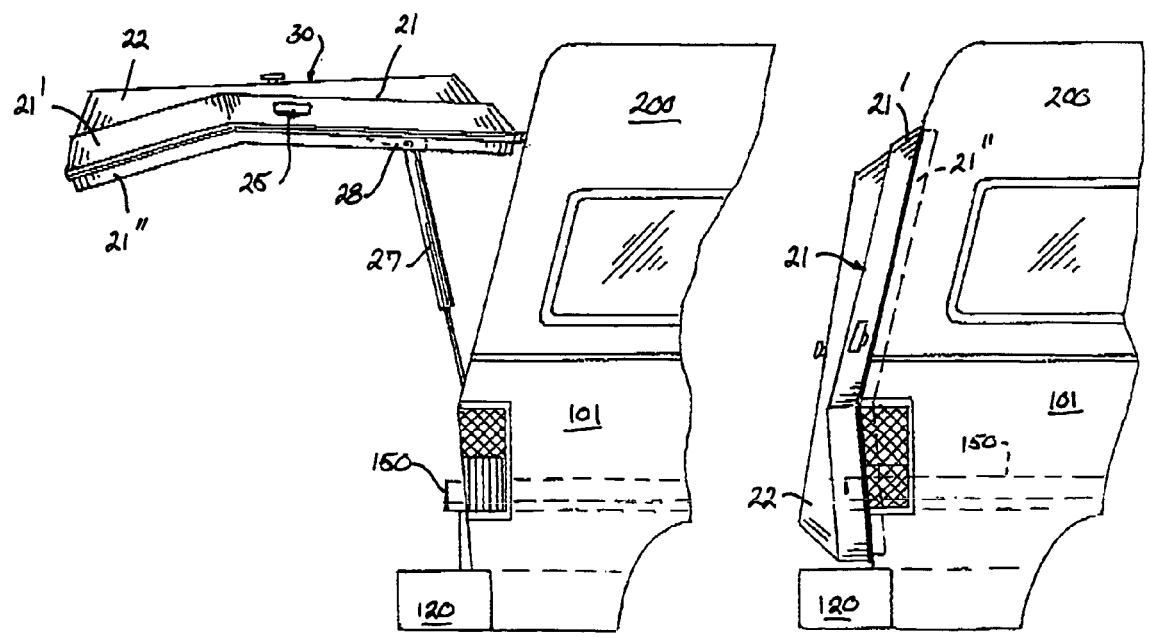
FIG. 4 is a side elevation view showing the hatch back construction in its open position.
FIG. 5 is a side elevation view showing the hatch back construction in its closed position.
Figure 6:
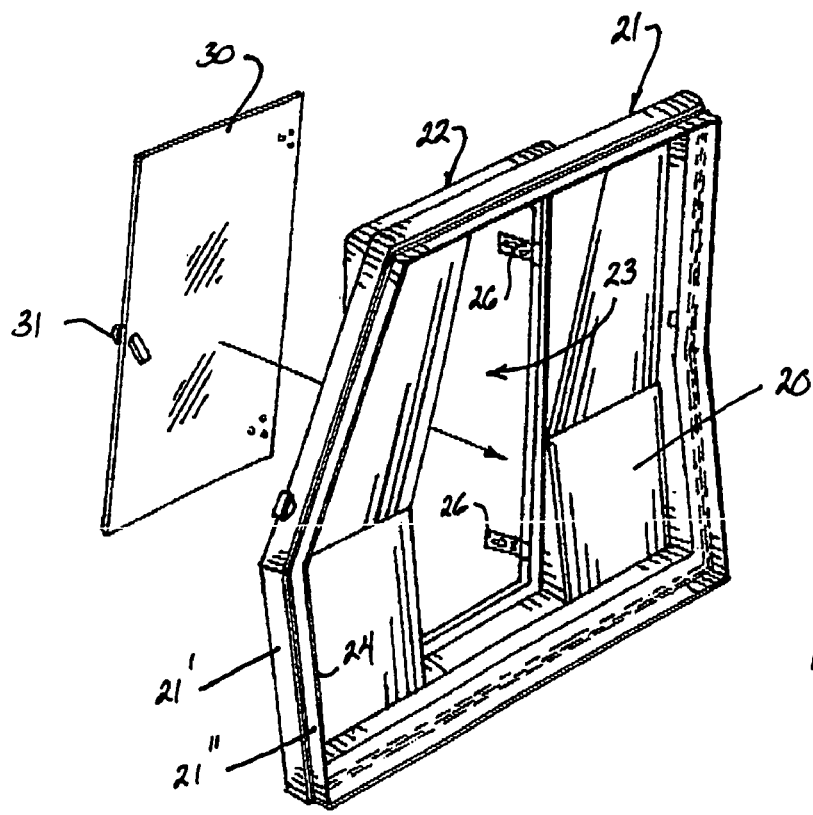
FIG. 6 is an exploded perspective view taken from the interior of the hatch back construction; and, FIG. 7 is a perspective view of the prior art hatch back construction that this invention is intended to replace.

As can best be seen by reference to FIGS. 2, 4, and 6, the hatch back construction 10 comprises hatch back member 20 provided with a continuous step shouldered peripheral skirt 21 wherein, the central portion of the hatch back member 20 is provided with an outwardly projecting portal sleeve 22 that defines a portal opening 23 adapted to receive a door element 30. Furthermore, the step shouldered peripheral skirt 21 having a minimum depth of 3" and an inner portion 21" having a minimum depth of 2".

At this juncture it should be noted that the hatch back member 20 is intended to be pivotally secured on the exterior of the camper shell 200 and come into lush engagement with both the exterior of the rear end of the pick-up truck bed 101, and the interior tailgate stop flange 101'

Furthermore, prior to the installation of the hatch back member 20, the conventional tailgate of the pick-up truck bed 101 will be removed immediately providing a gain of 2" in the effective length of the bed 101 of the pick-up truck 100.

In addition, the outer portion 21' of the continuous peripheral skirt 21 of the hatch back member 20 will have a minimum depth of 3" the end result being that the conventional 72" bed 101 of a compact pick-up truck 100 will be expanded to 77" thereby meeting the immediate needs of the targeted demographics.

Turning now to FIGS. 4 and 5, it can be seen that the portal sleeve 22 also projects outwardly from the main body of the hatch back member 20 further expanding the effective length of the truck bed 101 at least over the height and width of the door element 30; and, while this incremental length gain may seem at first glance to be insignificant, it represents a not insubstantial gain in leg room for an individual over 6' tall who is sleeping within the confines of the pick-up truck bed 101.

In addition, as can be seen by reference to FIGS. 4 and 6, the inner periphery of the hatch back member 20 is provided with a resilient gasket 24 disposed in a channel formed on the inner end of the hatch back member 20 to form a tight seal when the pair of locking dogs 25 25 on the hatch back member 20 are engaged with the camper shell 200.

Furthermore, the portal sleeve 22 is provided with a pair of hinge elements 26 26 that support the door element 30 that is further provided with a lockable hatch 31 that engages one side of the portal sleeve 22 and a pair of extendable brace elements 27 are pivotally connected on one end to flange elements 28 on the hatch back member 20 and pivotally connected on their other end to either the truck bed 101 or the camper shell 200 to maintain the hatch back member 20 in a raised, generally horizontal position when full access is required.

As can also be appreciated by reference to FIGS. 4 and 5, an extended bed element 150 can be installed in the bed 101 of the pick-up truck 100 wherein, the outboard end of the bed element 150 extends beyond the confines of the pick-up bed 101 and overhangs a portion of the vehicle bumper 120 by virtue of the additional 5" of space that is captured by the hatch back construction of this invention.

Figure 7:
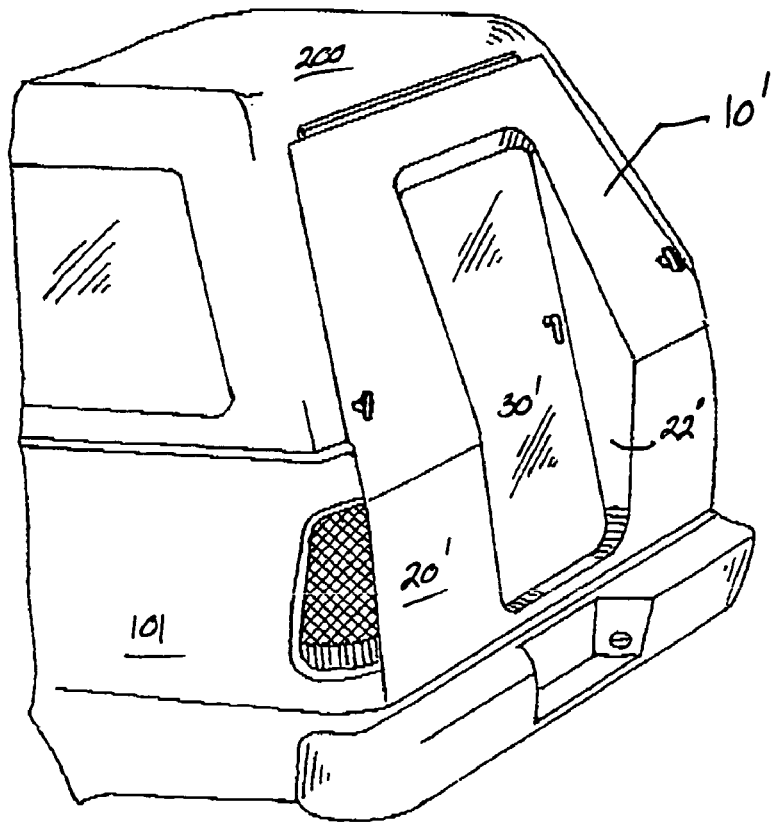

Turning now to FIG. 7, it can be seen that the prior art hatch back construction 10' manufactured by ARE employs a hatch back member 20' that is disposed in a flush relationship with the ends of both the truck bed 101 and the camper shell 200 resulting in a net loss of usable space within the truck bed 101 and the camper shell.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

The invention claimed is:

1. A hatch back construction for the bed of a pick-up truck equipped with a camper shell wherein, the construction comprises
    a hatch back member including a step shouldered skirt having an outer portion with a minimum depth
    means for mounting the hatch back member so that the hatch back member extends rearwardly from the camper shell and the bed of the pick-up truck; and
    wherein, the step shouldered skirt has an inner portion that is provided with a sealing gasket that comes into contact with both the camper shell and an interior tailgate stop flange of the bed of the pick-up truck.

2. The construction as in claim 1; wherein, the hatch back member has an upper portion that is pivotally connected to the camper shell.

3. The construction as in claim 1; wherein, the hatch back member is provided with a central portion that defines a portal opening adapted to receive a door element.

4. The construction as in claim 3; wherein, said portal opening is formed in a portal sleeve that extends outwardly from the remainder of the hatch back member.

5. The construction as in claim 4; wherein, the hatch back member is provided with a pair of locking dogs that are adapted to engage the opposite sides of the camper shell.

6. The construction as in claim 5; wherein, the hatch back member is further provided with a pair of flange elements that are each provided with an extensible brace element operatively connected to a selected one of the camper shell and the bed of the pick-up truck.

7. The construction as in claim 6; wherein, the hatch back member has an upper portion that is pivotally connected to the camper shell.

8. The construction as in claim 6; wherein, the interior surface of the peripheral skirt is provided with a sealing gasket that comes into contact with both the camper shell and the bed of the pick-up truck.

9. The construction as in claim 7; wherein, the interior surface of the peripheral skirt is provided with a sealing gasket that comes into contact with both the camper shell and the bed of the pick-up truck.

* * * * *